United States Patent Office 3,661,793
Patented May 9, 1972

3,661,793
DEFOAMING COMPOSITION AND A METHOD FOR ITS USE
Gerald B. Curtis, Haddonfield, N.J., assignor to Pioneer Chemical Works, Inc., Philadelphia, Pa.
No Drawing. Filed Aug. 22, 1969, Ser. No. 852,477
Int. Cl. B01d 17/00
U.S. Cl. 252—321                5 Claims

ABSTRACT OF THE DISCLOSURE

A composition is set forth comprising, by weight based on the composition, about 75% to about 97% of a water-insoluble hydrophobic organic liquid, about 3% to about 20% of normally hydrophilic perlite having a hydrophobic surface, 0% to about 5% of a surfactant, 0% to about 5% of hydrophobic silica and 0% to about 5% of a suspension aid. This composition is valuable in controlling foaming in an aqueous system.

BACKGROUND OF THE INVENTION

Field of the invention

The composition of the present invention as well as the method for its use is directed to the control and substantial elimination of foam in aqueous systems that would otherwise generate significant volumes of undesired foam. The composition is effective in small amounts and is relatively inexpensive.

Description of the prior art

All sorts of combinations of defoamers have been employed in the prior art with varying degrees of success and expense. Although numerous patents of general import could be referred to in Class 252, particularly subclasses 321 and 358 patents dealing with the related defoaming art typically are Patent Nos. 3,076,768 and 3,408,306 over which the present invention is clearly distinguishable.

SUMMARY OF THE INVENTION

This invention relates to improvements in composition and processes for reducing or preventing foaming in aqueous systems.

A principal object of the invention is the provision of a composition and a process for reducing or preventing foaming in aqueous systems which can be practiced inexpensively and effectively utilizing a composition formed of readily available materials.

Relatively small amounts of the composition have been found to be highly effective in suppressing, controlling or totally eliminating foam formation. The composition can be utilized as such or in the form of aqueous emulsions.

DESCRIPTION OF THE PREFERRED EMBODIMENTS

The composition of the present invention is prepared from a variety of relatively inexpensive water-insoluble hydrophobic organic liquids. Exemplary of these are vegetable oils, mineral hydrocarbons including mineral oils, i.e. paraffin oils, naphthenic oils, kerosene and similar petroleum fractions. It is also possible to use water-insoluble hydrophobic liquids containing polar groups. Exemplary of these are fluorinated and chlorofluorinated hydrocarbons such as the liquid trifluorovinyl chloride polymers; long chain alcohols such as nonyl alcohol, octyl alcohol, and the like; long chain amines such as octylamine, nonylamine, 2-ethyl-1-amino-heptane, and the like; long chain esters such as diglycol laurate. Mixtures of two or more of the above hydrophobic liquids can also be used, if desired.

The perlite contemplated for use herein is finely divided and normally hydrophilic, but which has been treated to render the surface thereof hydrophobic. A range of 3% to 20% by weight, based on the composition, is employed. The hydrophobic solid particles utilized in the novel defoaming compositions will desirably have a size range of about one to 100 microns with an average particle size of about 10 microns which material is available commercially without having to go to the expense of ball or jet milling. It is essential to the success of the present invention that the definition of the component be rigidly adhered to.

Any suitable method can be used for treating the normally hydrophilic perlite to import hydrophobic characteristics to the surfaces thereof. Exemplary of such treatments are those described in U.S. Patent Nos. 2,510,661, 2,870,190 and 2,589,705. Typical of these are treatments with methyl chlorosilane vapors, heating with silicone oil, and so forth.

The most effective defoamer composition results, however, when the techniques described in Example 1 are employed using aqueous ammonia as necessary to bring the pH of the intermediate composition to about 7.

The third component of the composition is a surfactant material. Any anionic, cationic, or nonionic emulsifier can be used as the surfactant. Examples of suitable anionic emulsifiers are alkali metal, ammonium, and amine soaps; the fatty acid part of such soaps contains preferably at least 16 carbon atoms because soaps based on lauric and myristic acids have a great tendency to develop abundant foam. The soaps can also be formed "in situ"; in other words, a fatty acid can be added to the oil phase and an alkaline material to the aqueous phase.

Examples of suitable cationic emulsifiers are salts of long chain primary, secondary, or tertiary amines, such as oleylamine acetate, cetylamine acetate, di-dodecylamine lactate, the acetate of aminoethyl-aminoethyl stearamide, dilauroyl triethylene tetramine diacetate, 1-aminoethyl-2-heptadecenyl imidazoline acetate; and quaternary salts, such as cetylpyridinium bromide, hexadecylethyl morpholinium chloride, and diethyl di-dodecylammonium chloride.

Examples of suitable nonionic emulsifiers are condensation products of higher fatty alcohols with ethylene oxide such as the reaction product of oleyl alcohol with 10 ethylene oxide units; condensation products of alkylphenols with ethylene oxide, such as the reaction product of isooctylphenyl with 12 ethylene oxide units; condensation products of higher fatty acid amides with five or more, ethylene oxide units; polyethylene glycol esters of long chain fatty acids, such as tetraethylene glycol monopalmitate, hexaethyleneglycol monolaurate, nonaethyleneglycol monostearate, nonaethyleneglycol dioleate, tridecaethyleneglycol monoarachidate, tricosaethyleneglycol, monobehenate, tricolaethyleneglycol dibenate, polyhydric alcohol partial higher fatty acid esters such as sorbitan tristearate ethylene oxide condensation products of polyhydric alcohol partial higher fatty acid esters, and their inner anhydrides (mannitol-anhydride, called mannitan, and sorbitol-anhydride, called sorbitan), such as glycerol monopalmitate reacted with 10 molecules of ethylene oxide, sorbitan monostearate reacted with 10 to 15 molecules of ethylene oxide, mannitan monopalmite reacted with 10 to 15 molecules of ethylene oxide; long chain polyglycols in which one hydroxyl group is esterified with a higher fatty acid and the other hydroxyl group is etherified with a low molecular alcohol, such as methoxypolyethylene glycol 550 monostearate (550 meaning the average molecular weight of the polyglycol ether). A combination of two or more of these emulsifiers may be used, if desired. For instance, a cationic may be blended with a nonionic or an anionic with a nonionic.

The fourth component of the composition is a suspension aid employed to keep the hydrophobic particles of perlite evenly distributed throughout the volume of the organic liquid. Any suspension aid liquid or solid can be used. Examples of suitable suspension aids are fumed silica, proprietary materials Thixin, Thixatrol, MPA, and Post-4 manufactured by Baker Castor Oil Co., Bayonne, N.J., other proprietary materials, Ben-A-Gel, and Bentone manufactured by National Lead Co., New York, N.Y., other proprietary materials Calidria Resin Grade Asbestos manufactured by Union Carbide Co., New York, N.Y., and Butoxyne manufactured by General Analine and Film Corp., New York, N.Y. A combination of two or more of these suspension aids may be used, if desired.

The suspension aids previously referred to may be identified by reference to prior publications and sources. As has heretofore been known, Thixin represents hydrogenated castor glycerides, Ben-A-Gel is hydrous magnesium silicate, the Bentone group are organic derivatives of hydrous magnesium silicate minerals, and the Butoxyne series are alkyl-hydroxybutyramides.

The fifth component of the present composition is hydrophobic silica which is available commerically or may be prepared from well known forms of silica such as silica aerogel or fume silica or the like. There are known methods for treating the normally hydrophilic silica to make it hydrophobic such as by spraying the silica with dimethylsiloxane and heating at elevated temperatures. One may accomplish a similar result by treatment in hot silicone oil and subsequent extraction.

The proportions of ingredients in the composition of the invention can be varied widely. In general, defoaming efficiencies appear to increase with increasing proportions of solids. However, when the proportion of solids is too high, handling difficulties are encountered. Therefore, in order to retain fluidity of the product to allow ease in handling during use, the proportion of solids should not exceed about 20% and preferrably about 15% by weight of the composition. It is possible to use as little as 3% of solids although it is preferred to use at least about 10%.

The weight range of the water-insoluble hydrophobic organic liquid can vary ffrom about 75% to about 97% of the composition. The preferred range of organic liquid content is from about 75% to about 85%.

The amount of surfactant material used will depend on the particular composition and the particular surfactant, as will be understood by those skilled in the art. In some cases as little as 0.5% by weight, based on the weight of the composition, can be used. Generally, however, it will be desirable to use at least about 2% of this material. In most cases not more than about 5% will be required. The preferred range is from about 1% to 3%. As previously mentioned, when aqueous ammonia is used to adjust the pH as in Examples 1 and 2 it is not necessary to include a surfactant material in the composition.

The hydrophobic silica is not always required, but generally it is desirable to use at least about 0.2% of this material. In most cases not more than about 5% will be required. The preferred range is from about 0.4% to 3% by weight, based on the composition.

The amount of suspension aid used will depend on the particular composition and the particular suspension aid. In some cases, no suspension aid is necessary but in other cases at least about 0.5% by weight, based on the weight of the composition is necessary. Generally it is desirable to use at least about 2% of this material. In most cases not more than about 5% will be required. The preferred range is from about 1% to 3% by weight, based on the composition.

The composition of the present invention is prepared from the described components by methods understood by those skilled in the art.

The compositions of the invention can be utilized as such by merely adding a small amount, i.e., at least about one part per million, to the aqueous system in which control of foaming is desired. There is, of course, no upper limit on the amount which is added except for its expense. In general, however, there is no practical advantage to be gained in adding the compositions in an amount greater than about 1.0%, by weight. Alternatively, these compositions can be converted to aqueous emulsions by adding water and an emulsifying agent and then vigorously agitating, usually by passage through a colloid mill or homogenizer. Any suitable emulsifying agents, such as a mixture of an equal weight percent of sorbitan monostearate and polyoxyethylene sorbitan monostearate, can be utilized for the purpose. From about 5% to about 10% of the emulsifier based on the oil phase will usually suffice. The amount of water utilized in the preparation of these emulsions can vary from about 50% to about 70% based on the emulsion.

The defoamer compositions of the present invention are highly advantageous because of their low cost and high efficiencies which are equivalent to and in some cases surpass those of very expensive prior art defoamers costing many times as much. Moreover, the defoamer compositions of the invention retain their efficiencies in a given system for prolonged periods of time and consistently much longer than most other commercial defoamers. The following examples are given to illustrate but in no way limit the present invention.

Example 1.—Fifteen parts of perlite, prepared by expanding crushed perlite ore using high temperature furnaces, and having a particle size of about 1–100 microns was dispersed in 80 parts of paraffinic mineral oil. To this dispersion was added methyl chlorosilane. Water was then added to the mixture and the resulting HCl was removed. The mixture was brought to a pH of about 7 using $NH_4OH$. There were then added 0.5 part of a commercially available hydrophobic silica and 1.6 parts of a commerically available suspension aid. The entire mixture was homogenized.

The composition prepared as above described was evaluated as a defoamer in comparison with a well-known commercial silicone defoamer. This evaluation was carried out according to known practice. Two hundred fifty milliliters of concentrated black liquor (filtrate water from the first washer of an alkaline pulping system) was heated to 90° C. Two hundred parts per million of each of the commercial silicone defoamer and the defoamer prepared as above described was added to the above liquid in separate graduates. Each was shaken vigorously three times for periods of 10 seconds. A foam of 0.5 cm. developed in the liquid containing the commercial silicone defoamer, whereas no foam developed in the liquid containing the defoamer prepared in accordance with the present invention.

Example 2.—Fifteen parts of perlite prepared in accordance with the method described in Example 1 was dispersed in 80 parts of naphthenic mineral oil, To this dispersion was added a polymeric silicone fluid containing some unhydrolyzed silicon-chlorine bonds. Water was added to the mixture and the resulting HCl was removed. The mixture was brought to a pH of about 7 using $NH_4OH$. There were then added 0.5 part of a commercially available hydrophobic silica and 1.6 parts of a commercially available suspension aid and the mixture homogenized. The composition was then evaluated as a defoamer as set forth in Example 1 and the results obtained were equivalent to the results obtained in Example 1.

Example 3.—Fifteen parts of perlite prepared in accordance with the method described in Example 1 was sprayed with 10% by weight, based on the weight of perlite, of a dimethylpolysiloxane oil having a viscosity of 50 centistokes. The resulting mixture was heated at 300° C. for one hour and then cooled. The treated perlite was dispersed in 80 parts of deodorized kerosene. There were added 0.5 part of a commercially available hydrophobic silica, 0.6 part of a commercially available suspension aid, and three parts of a nonionic emulsifier and the mixture homogenized. The composition was then evaluated as a defoamer as set forth in Example 1 and the results obtained were equivalent to the results obtained in Example 1.

Of the examples shown, the preferential composition and the one which exhibits the best effect is as follows. The finely divided normally hydrophilic perlite substrate is made hydrophobic by the reaction of a methylchlorosilane with water. This mixture is then brought to a pH of about 7 with aqueous ammonia. To this mixture is added, if desired, the commercially available hydrophobic silica and a suspension aid.

What is claimed is:

1. A composition consisting essentially of by weight based on the composition:
   (a) about 75% to about 97% of a water insoluble hydrophobic organic liquid from the group consisting of vegetable oils; mineral hydrocarbons including mineral oils; water-insoluble hydrophobic liquids and including fluorinated and chlorofluorinated hydrocarbons; long chain alcohols, including nonyl alcohol, and octyl alcohol; long chain amines including octylamine, nonylamine, 2-ethyl-1-amino-heptane; long chain esters including diglycol laurate A; and mixtures thereof;
   (b) about 3% to about 20% of normally hydrophilic perlite having a hydrophobic surface;
   (c) 0% to about 5% of an organic emulsifier for the organic liquid; and
   (d) 0% to about 5% of hydrophobic silica.

2. A composition according the claim 1 which further contains:
   (e) 0% to about 5% of a suspension aid for the perlite from the group consisting of fumed silica, hydrogenated castor glycerides, hydrous magnesium silicates, organic derivatives of magnesium aluminum silicate minerals and alkyl hydroxybutyramides, and ammonia in an amount to neutralize the composition.

3. A composition according to claim 2 comprising of said (a) about 75% to about 85%;
   of said (b) about 3% to about 20%;
   of said (c) about 1% to about 3%;
   of said (d) about 0.2% to about 3%; and
   of said (e) about 1% to about 3.0%.

4. An aqueous defoamer emulsion made up of water and a defoamer composition as defined in claim 1 and containing said emulsifier in the amount of 0.5% to 5%.

5. A method of combating foaming in an aqueous system comprising adding the composition of claim 1 in the weight amount of at least about one part of said composition to one million parts of said system.

References Cited

UNITED STATES PATENTS

| | | | |
|---|---|---|---|
| 3,076,768 | 2/1963 | Boylan | 252—321 |
| 2,704,965 | 3/1955 | Seybold | 117—100 |

FOREIGN PATENTS

| | | |
|---|---|---|
| 1,195,220 | 6/1965 | Germany. |
| 1,221,387 | 7/1966 | Germany. |

JOHN D. WELSH, Primary Examiner

U.S. Cl. X.R.

252—358